(12) United States Patent  (10) Patent No.: US 7,837,434 B2
Rabis et al.  (45) Date of Patent: Nov. 23, 2010

(54) POWER TOOL

(75) Inventors: Manfred Rabis, Schwaikheim (DE);
Harald Schliemann, Waiblingen (DE)

(73) Assignee: Andreas Stihl AG & Co. KG,
Waiblingen (DE)

( * ) Notice: Subject to any disclaimer, the term of this
patent is extended or adjusted under 35
U.S.C. 154(b) by 1297 days.

(21) Appl. No.: 11/307,517

(22) Filed: Feb. 10, 2006

(65) Prior Publication Data
US 2006/0289186 A1  Dec. 28, 2006

(30) Foreign Application Priority Data
Feb. 17, 2005  (DE) ................ 10 2005 007 294
Jan. 24, 2006  (DE) ................ 10 2006 003 202

(51) Int. Cl.
B25D 17/04 (2006.01)
F16F 15/00 (2006.01)
B25F 5/00 (2006.01)

(52) U.S. Cl. ................ 415/119; 415/204; 415/206

(58) Field of Classification Search ............ 173/162.2;
415/119, 204, 206
See application file for complete search history.

(56) References Cited

U.S. PATENT DOCUMENTS

| 4,371,043 A * | 2/1983 | Kubokawa ............ 173/162.2 |
| 5,368,107 A | 11/1994 | Taomo ............ 173/162.2 |
| 5,535,479 A * | 7/1996 | Pink et al. ............ 15/410 |
| 5,699,865 A | 12/1997 | Föderer et al. |
| 5,806,133 A * | 9/1998 | Iida ............ 15/412 |
| 6,375,171 B1 * | 4/2002 | Zimmermann et al. ...... 267/137 |
| 2002/0104665 A1 | 8/2002 | Wolf et al. |
| 2005/0123393 A1 | 6/2005 | Saitou et al. |

FOREIGN PATENT DOCUMENTS

| DE | 10036078 A1 | 2/2002 |
| DE | 10332522 A1 | 2/2005 |
| EP | 1533084 A1 | 5/2005 |
| GB | 1170313 | * 11/1969 |
| GB | 2086005 A | 5/1982 |
| GB | 2297514 A | 8/1996 |

* cited by examiner

*Primary Examiner*—Edward Look
*Assistant Examiner*—Jesse Prager
(74) *Attorney, Agent, or Firm*—Gudrun E. Huckett

(57) ABSTRACT

A hand-guided power tool has a housing having a first housing part and a second housing part. A grip unit has at least one handle for guiding the power tool and forms the first housing part. A motor unit is arranged in the second housing part and has a drive motor. The grip unit and the motor unit are connected to one another by at least one antivibration element. The at least one antivibration element has a first end secured to the first housing part and a second end secured to the second housing part. The first housing part has at least one receptacle extending from an exterior of the first housing part into a housing interior of the housing. The at least one antivibration element has a longitudinal extension and is surrounded over at least a portion of the longitudinal extension by the at least one receptacle.

13 Claims, 8 Drawing Sheets

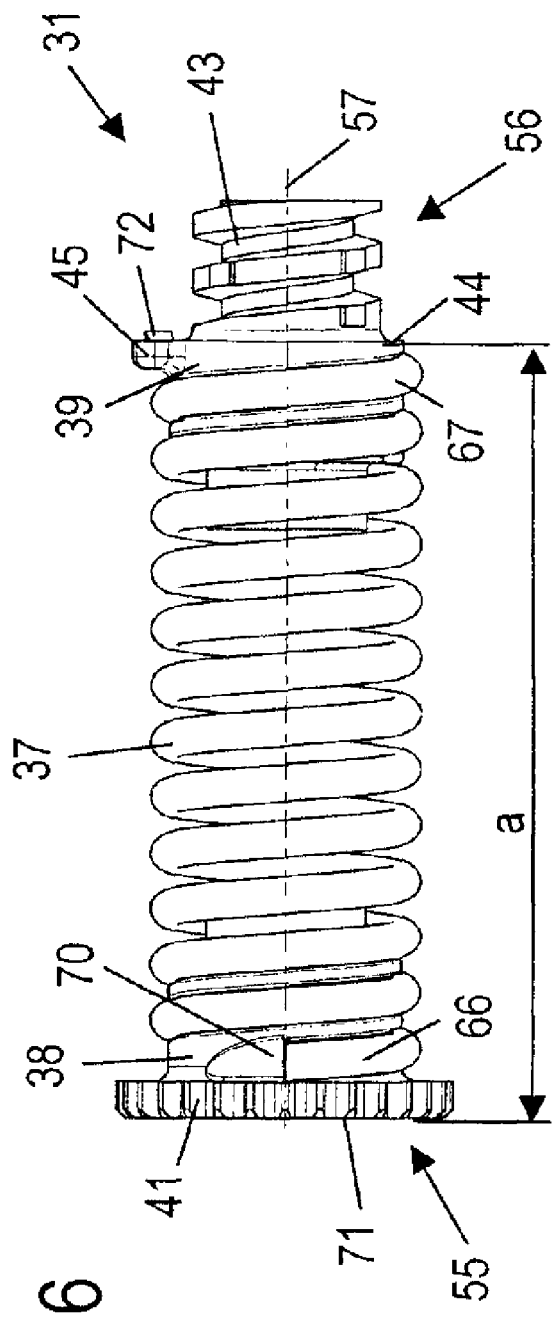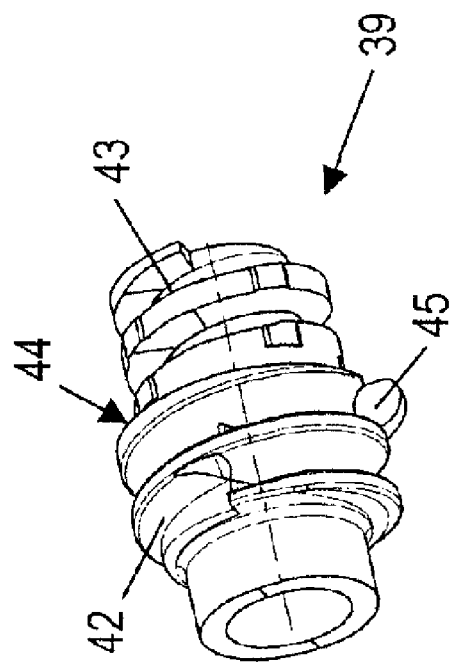
Fig. 6
Fig. 7

POWER TOOL

BACKGROUND OF THE INVENTION

The invention relates to a hand-guided power tool comprising a motor unit with a drive motor and further comprising a grip unit that has at least one handle for guiding the power tool, wherein the motor unit and the grip unit are connected to one another by at least one antivibration element and wherein the antivibration element is secured with a first end to a first housing part and with a second end to a second housing part.

U.S. Pat. No. 5,368,107 discloses a power saw having an antivibration element. The antivibration element is secured with the first end to a grip unit and with the second end to a motor unit. The antivibration element is exposed and visible from the exterior and accessible between the housing parts. Because of this, there is the risk of soiling of the antivibration element; this can lead to functional impairment, for example, when cuttings lodge between the windings of the antivibration element and thereby impair the damping effect. The visible antivibration element impairs also the visual appearance of the power saw.

SUMMARY OF THE INVENTION

It is an object of the invention to provide a hand-guided power tool of the aforementioned kind that provides an excellent vibration damping action and has an appealing outer appearance.

This object is solved by a hand-guided power tool wherein the antivibration element, over at least a portion of its longitudinal extension, is surrounded by a receptacle that extends from the exterior of the first housing part into the housing interior.

The arrangement of the antivibration element in a receptacle provides excellent protection of the antivibration element against soiling. In this way, an excellent damping behavior is ensured. The arrangement in a receptacle that extends from the exterior of the housing part into the housing interior enables a closed configuration of the housing part. In this way, penetration of dirt into the housing interior in the area of the antivibration element is prevented. Damage to the antivibration element or the holding devices at the ends of the antivibration element can be prevented. The operational safety of the power tool is thus increased. By arranging the antivibration element in the receptacle, the antivibration element is not, or hardly, accessible to the operator so that accidental contact of the antivibration element is prevented. Accordingly, the risk of injury for the operator, for example, by being pinched, is reduced. Because the antivibration element is surrounded across at least a portion of its length by the receptacle, the antivibration element is hardly visible, or not at all visible, from the exterior. Accordingly, a power tool with an appealing outer appearance can be provided.

Preferably, the receptacle is cup-shaped. A cup-shaped receptacle can be produced in a simple way and allows a satisfactory relative movement between the two housing parts that are connected to one another by the antivibration element. The first end of the antivibration element is secured in particular to the bottom of the receptacle in the first housing part. It is provided that the first housing part has two shell parts that abut one another in a separation plane in the area of the antivibration element wherein the separation plane extends transversely to the longitudinal direction of the antivibration element and wherein the receptacle for the antivibration element extends through the separation plane. Since the receptacle extends from the exterior of the first shell part through the separation plane into the second shell part, the receptacle can be provided with a sufficient axial length so that the antivibration element is arranged almost completely within the receptacle. In this way, it is possible to arrange the antivibration element in such a way between the two housing parts that it is not visible from the exterior. Advantageously, the power tool has at least three, in particular four, antivibration elements that extend through the separation plane between the shell parts of the first housing part. Because the power tool has at least three antivibration elements, an excellent vibration damping action can be achieved. The arrangement of the antivibration elements transversely to the separation plane and in the area of the separation plane leads to excellent vibration damping properties.

Advantageously, the antivibration element comprises a coil spring. It is provided that each end of the coil spring has a fastening element with which the coil spring is secured to a housing part. Expediently, at least one fastening element is screwed into one end of the coil spring. In this way, the coil spring can be connected in a simple way to the fastening element. When the coil spring breaks, a simple exchange of the coil spring is possible. Advantageously, a means or device for securing the rotational position of the fastening element relative to the housing part is provided on the first fastening element. Since the fastening element cannot rotate relative to the housing part, it is prevented that the fastening element can accidentally unscrew out of the coil spring. In this way, the antivibration element is safely secured in both housing parts. Advantageously, the first fastening element is arranged within the receptacle in the first housing part.

It is provided that a second fastening element has a threaded socket with which the fastening element is screwed into a receiving opening of the housing part. No additional fastening means are therefore required for the fixation of the second fastening element on the housing part. The threaded socket has an outer thread that engages a thread of the housing part. In particular when manufacturing the housing part of plastic material by injection molding, a simple manufacture of the housing part is provided because an inner thread can be easily produced even in the case of a comparatively complex housing part. The outer thread of the threaded socket can be realized in a simple way on the fastening element having a simple design. Advantageously, the second fastening element has a stop that limits the screwing depth by which the fastening element can be screwed into the housing part. When mounting the antivibration element, first the threaded socket of the second fastening element is screwed into the receiving opening of the housing part until the stop prevents further screwing. Subsequently, the first housing part is arranged on the second housing part. In this connection, the rotational position of the first fastening element relative to the housing part is determined so that unscrewing of the coil spring out of the fastening element or a detachment of the second fastening element caused by the coil spring is prevented.

The power tool is in particular a vacuum/blower device that has a blower unit. Advantageously, the first housing part delimits the blower unit as well as the motor unit of the power tool. In this connection, the first housing part is advantageously arranged centrally between the motor unit and the blower unit so that a uniform weight distribution of the power tool results in this way.

BRIEF DESCRIPTION OF THE DRAWINGS

FIG. 6 shows an antivibration element of the vacuum/blower device in a side view.

FIG. 7 shows a plug of the antivibration element in a perspective illustration.

DESCRIPTION OF PREFERRED EMBODIMENTS

Figure 1:
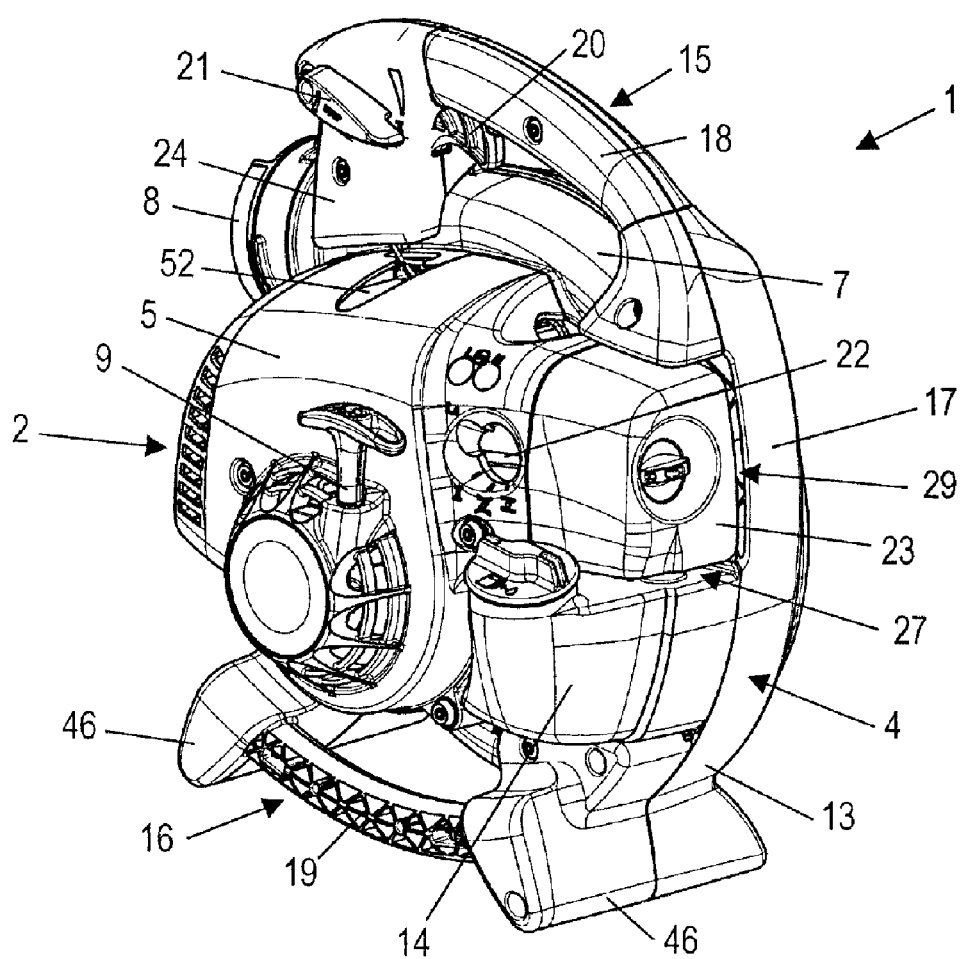
FIG. 1 is a first perspective illustration of a vacuum/blower device according to the invention.
Figure 2:
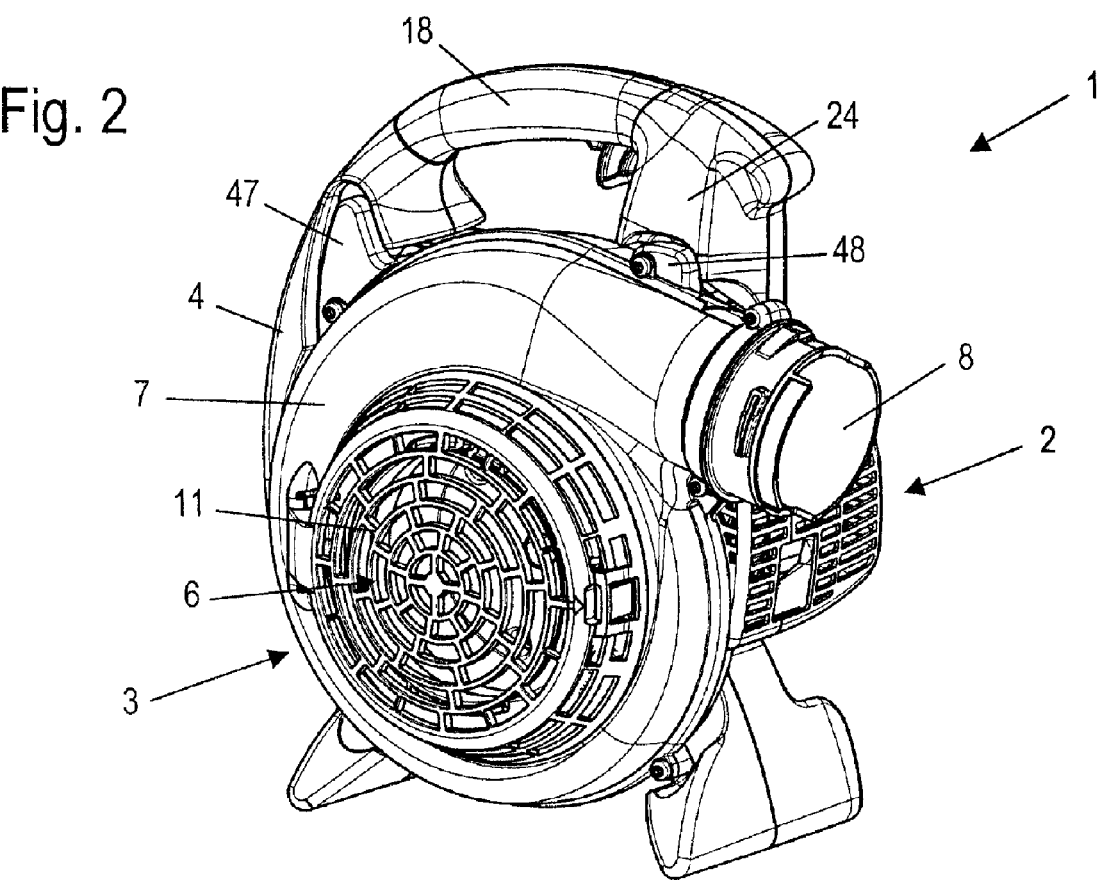
FIG. 2 is a second perspective illustration of the vacuum/blower device according to the invention.

In FIGS. 1 to 4 a hand-guided power tool, in particular, a vacuum/blower device 1 is shown. The vacuum/blower device comprises a motor unit 2 in which a drive motor (not illustrated in the Figures), in particular a single-cylinder two-stroke engine, is arranged. The vacuum/blower device 1 has a blower unit 3 as well as a grip unit 4. The blower unit 3 has a blower 6 that takes in air through intake screen 11 and conveys the air through a blower spiral 7 and through the discharge socket 8. The blower 6 is driven by the drive motor of the vacuum/blower device 1. In the blowing mode of the vacuum/blower device 1, a blower tube can be secured to the discharge socket 8 through which the air is conveyed. In vacuum mode, a vacuum tube is arranged in place of the intake screen 11 on the blower 6. A collecting bag or the like can be arranged on the discharge socket 8.

The blower 6 can be a radial blower or an axial blower. The blower unit 3 has a blower housing 12 that is fixedly connected to the motor housing 5 of the motor unit 2. The blower housing 12 and the motor housing 5 define a first housing part of the housing of the power tool. The grip unit 4 has a grip housing 13 forming a second housing part of the power tool. The blower 6 is driven by the drive motor about the axis of rotation 10 illustrated in FIG. 3. The axis of rotation 10 corresponds advantageously to the axis of rotation of a crankshaft of the drive motor. For starting the drive motor, the motor unit 2 has a pull cable starter 9. The drive motor has a choke device that can be operated by choke lever 22. An oil tank 23 is arranged on the motor housing 5.

The motor unit 2 and the blower unit 3 are fixedly connected to one another. The first housing part of the motor unit 2 and the blower unit 3 is secured on the second housing part of the grip unit 4 by antivibration elements not illustrated in FIGS. 1 through 4.

As shown in the Figures, the grip unit 4 is a C-shaped frame. The discharge socket 8 is positioned in the area between the legs of the C. The grip unit 4 has a first handle 18 on which an operating lever 20 and an operating lever 21 are arranged. The operating lever 20 can be, for example, the throttle trigger for the drive motor. Advantageously, the position of the operating lever 20 can be secured by means of the operating lever 21. In the blower mode, the first handle 18 is usually arranged on the top side of the vacuum/blower device 1. The grip unit 4 has a second handle 19 that is arranged on a side of the motor unit 2/blower unit 3 that is opposite the first handle 18. On both ends of the second handle 19 the grip unit 4 has two support legs 46 with which the vacuum/blower device 1 can be put down on the ground.

The grip housing 13 of the grip unit 4 forms the second housing part of the power tool. The first handle 18 is arranged on a first ring section 15 of the grip housing 13, and the second handle 19 is formed by a second ring section 16 of the grip housing 13. The two ring sections 15 and 16 are connected to one another by a center section 17. The fuel tank 14 of the vacuum/blower device 1 is formed as a unitary part of the center section 17. As shown in FIG. 1, the oil tank 23 in the illustrated position of the vacuum/blower device 1 in the blower mode is arranged above the fuel tank 14. Between the fuel tank 14 and the oil tank 23 there is play or a gap 27. The oil tank 23 is arranged horizontally adjacent to the center section 17 of the grip unit 4. Between the oil tank 23 and the center section 17 there is play or a gap 29.

Figure 4:
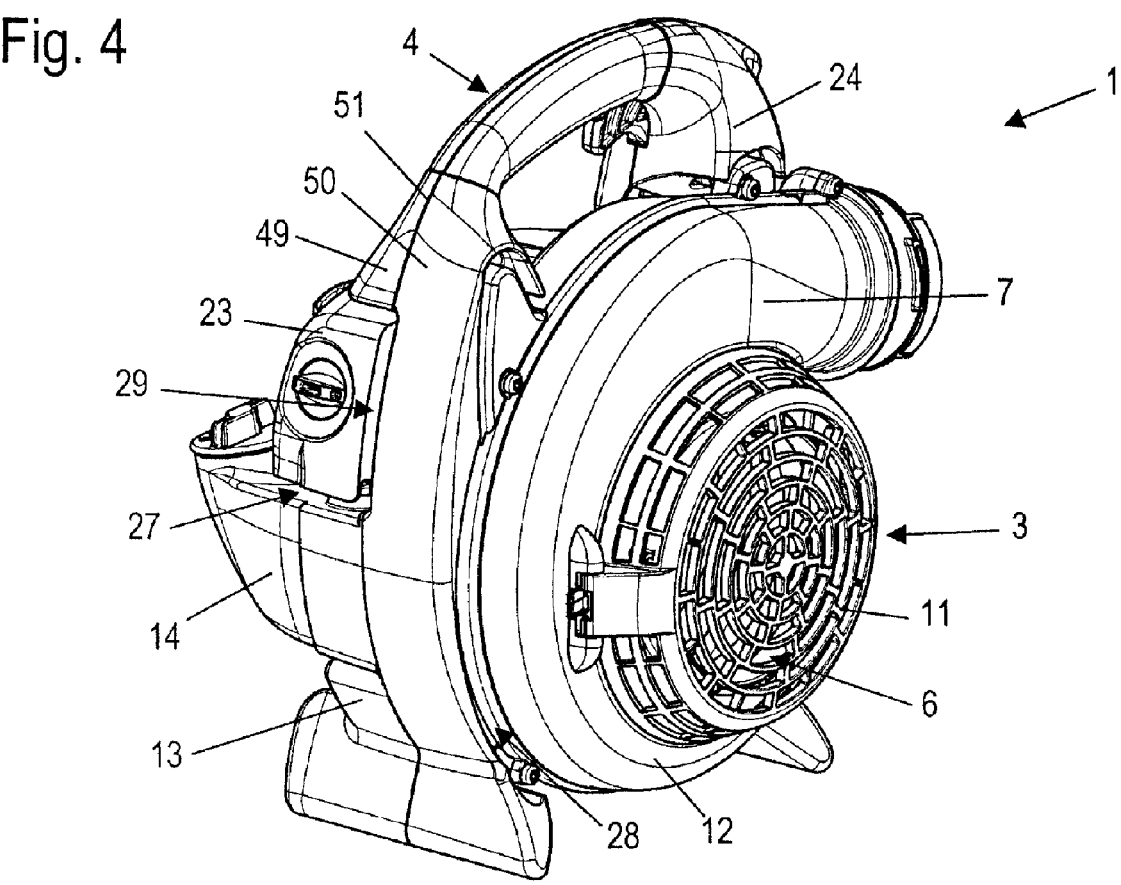
FIG. 4 is another perspective illustration of the vacuum/blower device according to the invention.

On the first ring section 15 of the grip unit 4 an end member 24 is arranged on which the operating lever 21 is positioned. The end member 24 is arranged above an opening 52 (FIG. 1) in the motor housing 5. In the area of the end member 24, the grip housing 13 of the grip unit 4 is open so that through the end member 24 and the opening 52 operating elements for operating the drive motor, for example, a pull rod or a Bowden cable by which the operating lever 20 is able to control the drive motor, can be guided. As shown in FIG. 4, the grip housing 13 is comprised of two shell parts 49 and 50 which abut one another at the separating plane 51 and are connected to one another.

Figure 3:
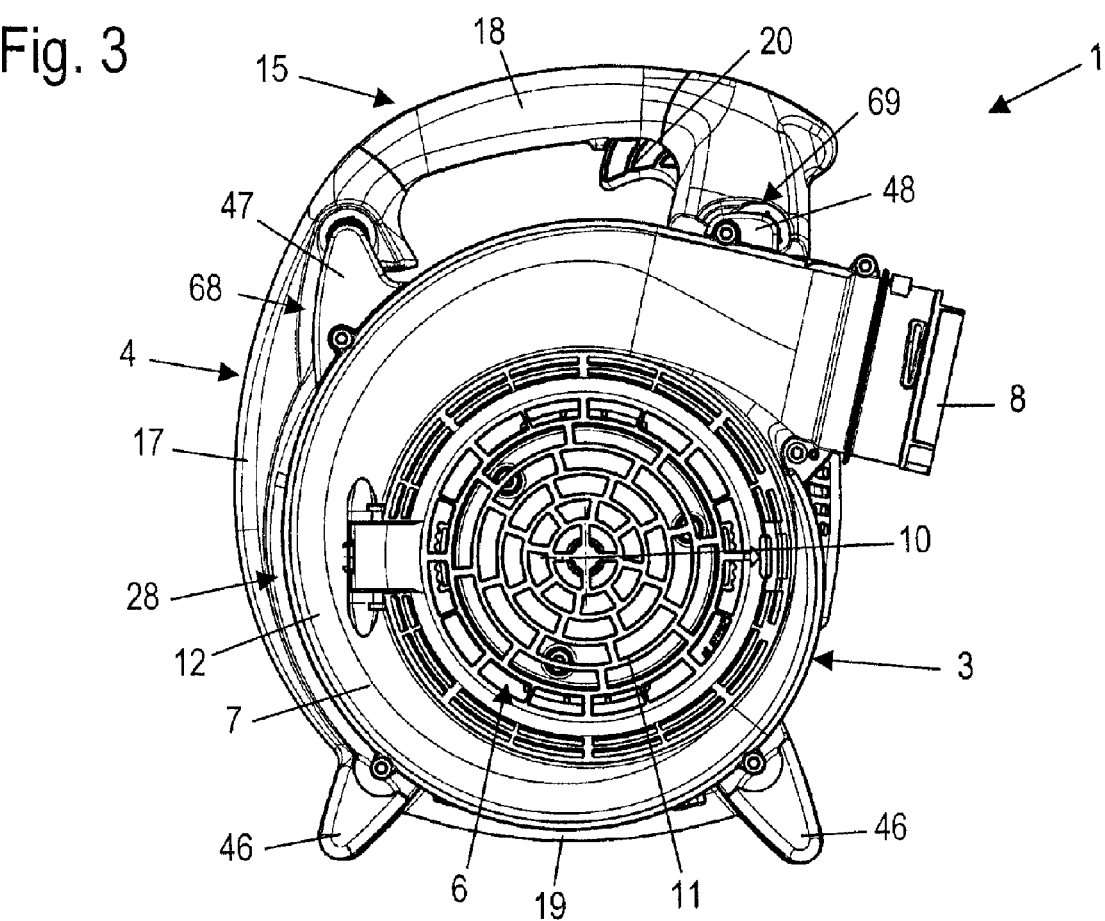
FIG. 3 is a side view of the vacuum/blower device according to the invention.

As shown in particular in FIG. 3, a nose 47 and a nose 48 are formed on the blower housing 12. The nose 47 projects into the area of the grip unit 4 in the area between the center section 17 and the first ring section 15 of the grip unit 4. The nose 48 extends into the grip unit 4 in the area of the end member 24. Between the nose 47 and the grip unit 4 there is play (a gap) 68; between the nose 48 and the grip unit 4 there is play (a gap) 69. As shown in FIGS. 3 and 4, between the grip housing 13 and the blower spiral 7 there is a gap or play 28. Because of the gaps (play) 27, 28, 29, 68, 69 a relative movement between the motor unit 2 or the blower unit 3 and the grip unit 4 is possible. In order to enable this relative movement, the motor unit 2 and the blower unit 3 are secured on the grip unit 4 by means of antivibration elements.

Figure 5:
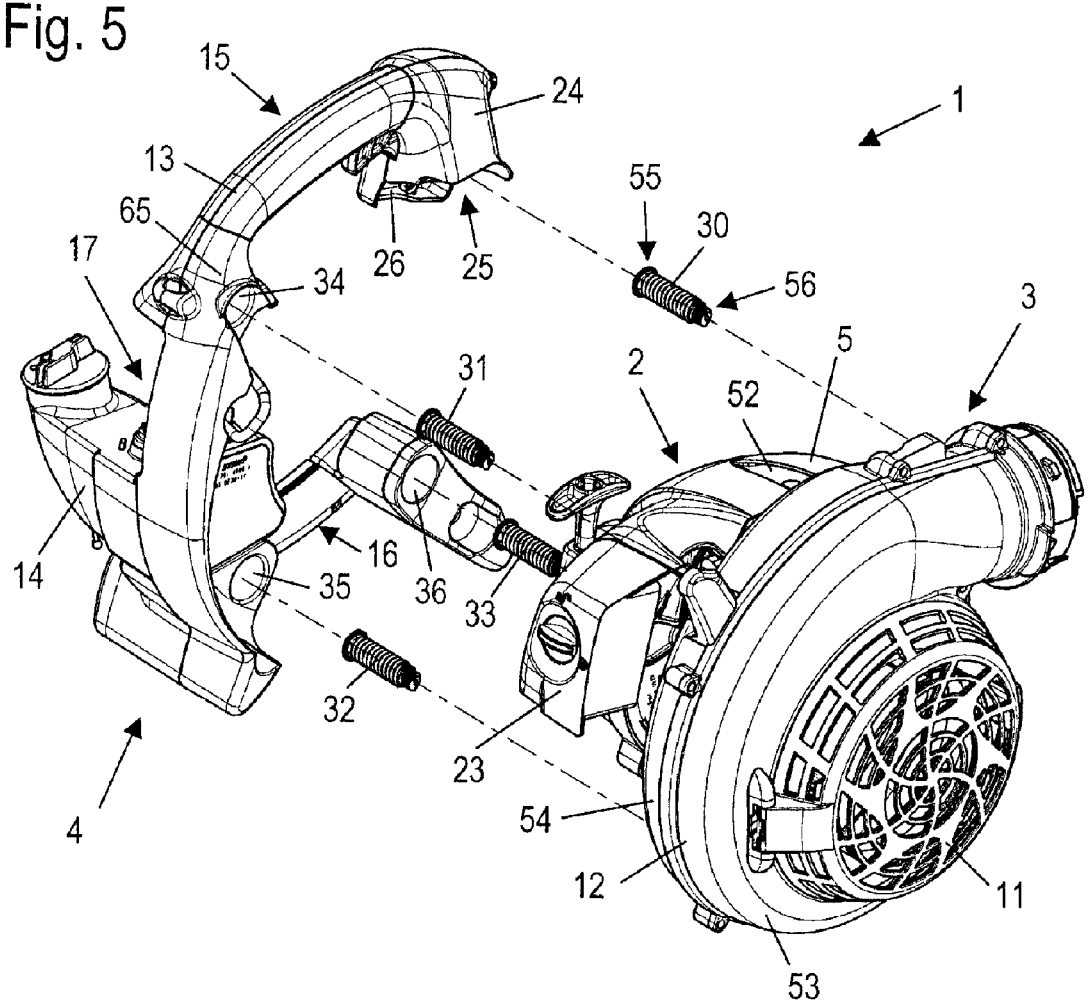
FIG. 5 shows the vacuum/blower device in an exploded view showing the housing part of the blower unit/motor unit and the housing part of the grip unit.
Figure 9:
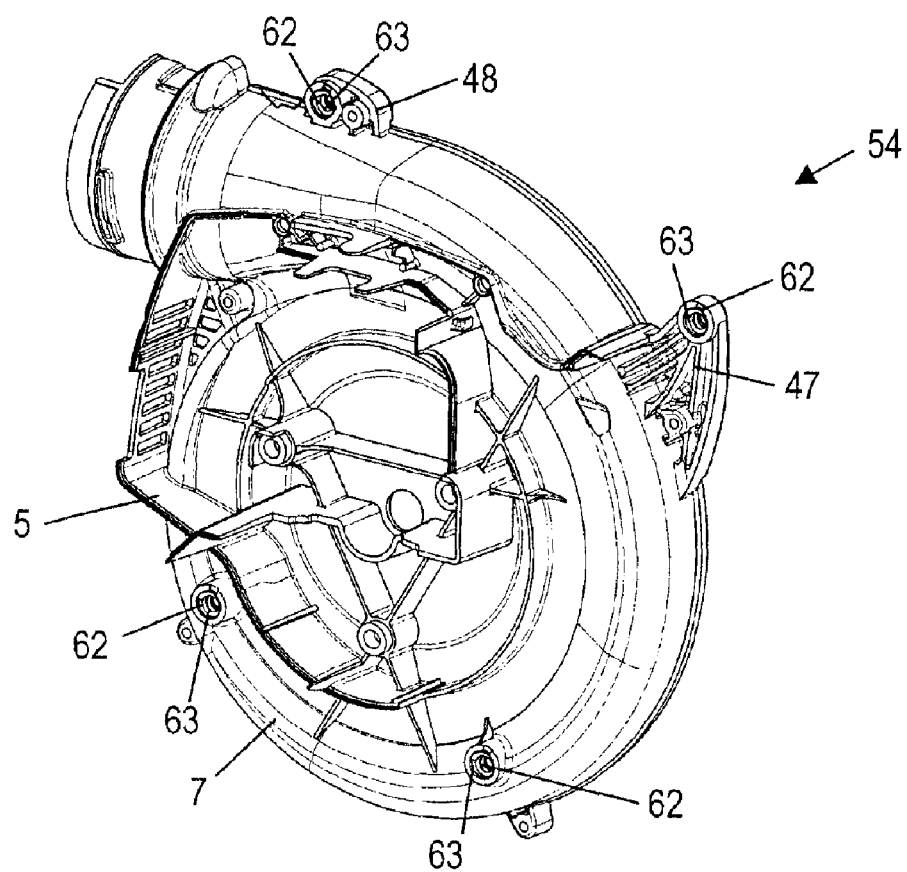
FIG. 9 shows a shell part of the blower housing of the vacuum/blower device in a perspective illustration.

As shown in the exploded view of FIG. 5, four antivibration elements 30, 31, 32, 33 are arranged between the grip unit 4 and motor unit 2 as well as blower unit 3. The blower housing 12 of the blower unit 3 has a first shell part 53 and a second shell part 54 that are connected fixedly to one another; each one delimits one half of the blower spiral 7. The motor housing 5 is arranged on the shell part 54 facing the motor unit 2. As shown in FIG. 9, the shell part 54 forms the rear wall of the motor housing 5.

The antivibration element 30 is arranged in the area of the open side 25 of the end member 24. The antivibration element 30 is secured with one end 55 to an inner wall 26 of the end member 24. The opposite second end 56 of the antivibration element 30 is arranged on the shell part 54 of the blower housing 12. The grip unit 4 has cup-shaped receptacles 34, 35, 36 for the antivibration elements 31, 32, 33. The receptacles 34, 35, 36 extend from the exterior side 56 of the grip housing 13 into the interior of the grip housing 13. With the exception of the open side 25, the grip housing 13 is a closed housing.

In FIG. 6, the antivibration element 31 is shown in a side view. The antivibration elements 30, 32, 33 are identical. The antivibration element 31 has a coil spring 37. A plug 38 is screwed into a first end 66 of the coil spring 37 and a second plug 39 into the second end 67. Both plugs 38, 39 have outer threads for receiving the coil spring 37 and are screwed into the interior of the coil spring 37. The plug(s) 38, 39 can also have an inner thread and can be screwed on to the outer circumference of the spring 37. The plug 38 has a stop 70; the end 66 of the coil spring 37 rests against the stop. A stop 45 for the end 67 of the coil spring 37 is formed on the plug 39. The plugs 38 and 39 advantageously are comprised of plastic material.

The plug 38 has an end plate 71 with a toothing 41 on its outer circumference. The end plate 71 of the plug 38 has a greater diameter than the coil spring 37. A threaded socket 43 having an outer thread is formed on the plug 39. As shown in the perspective illustration in FIG. 7, the plug 39 has an outer thread 42 in the area in which the coil spring 37 is screwed into the plug 39. A stop 44 is formed between the threaded socket 43 and the thread 42. On the surface that forms the stop 44 a locking nose 72 is formed that locks the plug 39 in the screwed-in state on the blower housing 12. In this connection, the threaded socket 43 has a smaller diameter than the area of the thread 42 of the plug. The antivibration element 31 has longitudinal extension a which is measured in the longitudinal direction 57 from the stop 44 to the end plate 71. The longitudinal extension a correspondence thus to the spacing between the two housing parts on the antivibration element 31.

Figure 8:
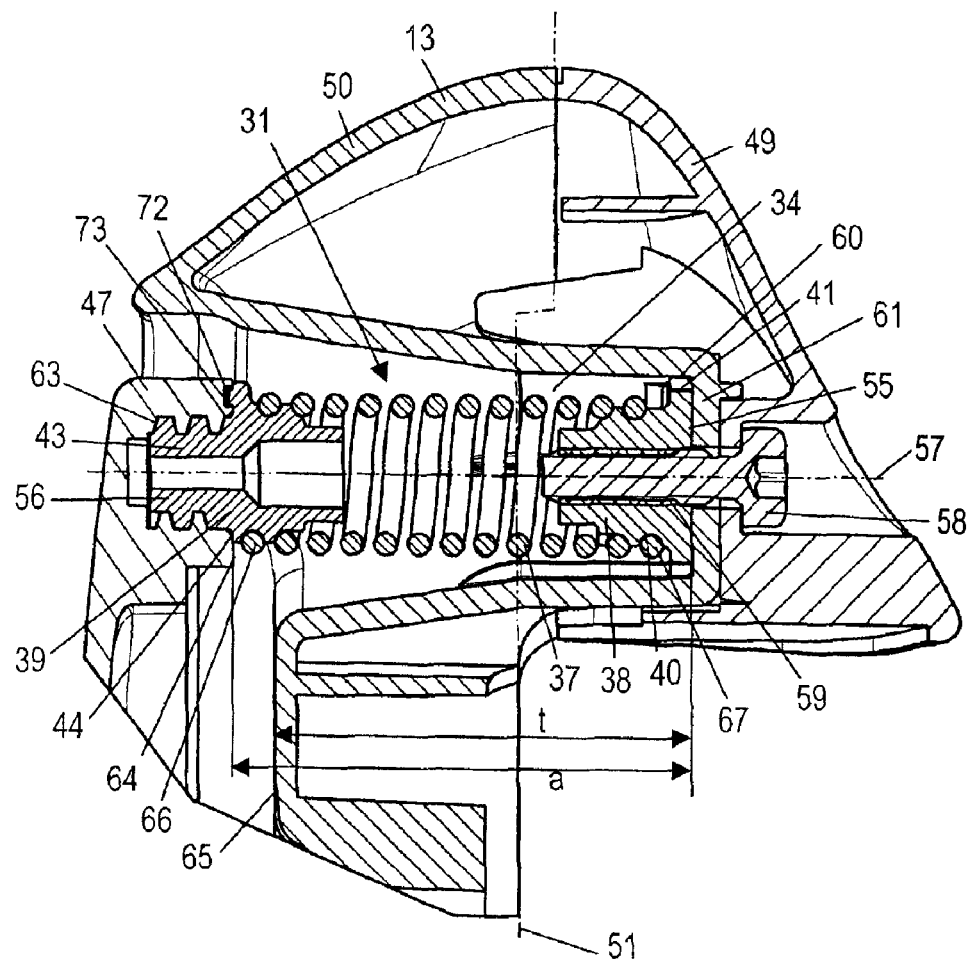
FIG. 8 is a sectioned detail view of the vacuum/blower device in the area of the antivibration element.

FIG. 8 illustrates a section of the antivibration element 31 in the mounted state. The two shell parts 49 and 50 of the grip housing 13 abut one another at the separating plane 51 that does not extend planar but, adjacent to the antivibration element 31, forms a step. The separation plane 51 can also be curved or stepped several times. As shown in FIG. 8, the antivibration element 31 is arranged approximately with its entire longitudinal extension a in the receptacle 34. The receptacle 34 is cup-shaped. The first end 55 of the antivibration element 31 is arranged at the bottom 61 of the receptacle 34. As shown in FIG. 8, the plug 38 has an outer thread 40 onto which the coil spring 37 is screwed. In the area of the bottom 61 of the receptacle 34, a counter toothing 60 for the toothing 41 is provided that cooperates with the toothing 41 and secures the rotational position of the plug 38 in this way. The counter toothing 60 can be comprised of only a single tooth. The plug 38 has a threaded bore 59 that extends in the longitudinal direction 57 of the antivibration element 31. A fastenings screw 58 is screwed into the threaded bore 59 from the interior of the grip housing 13 for securing the plug 38 on the bottom of the receptacle 34. The longitudinal direction 57 of the antivibration element 31 corresponds to the longitudinal center axis of the coil spring 37. The longitudinal direction 57 is defined by the two ends 55 and 56 of the antivibration element 31.

The receptacle 34 extends from the exterior 65 of the grip housing 13 into the interior of the grip housing 13. In this connection, the receptacle 34 extends from the shell part 50 through the separating plane 51 into the area of the shell part 49. The receptacle 34 extends accordingly across approximately the entire width of the grip housing 13. The receptacle 34 has a depth t that is measured from the exterior 65 of the grip housing 13 to the bottom 61; the depth t is more than 50 percent, in particular, more than 80 percent, of the longitudinal extension a of the antivibration element 31 so that more than half, advantageously more than 80 percent, of the longitudinal extension a of the antivibration element 31 is surrounded or enclosed by the receptacle 34. The second end 56 of the antivibration element 31 is secured on the nose 47 of the blower housing 12. The receptacle 34 widens in its forward area toward the nose 47 so that a sufficient freedom of movement between the grip housing 13 and the blower housing 12 is ensured. The nose 47 has a receiving opening 62 illustrated in FIG. 9 with an inner thread 63 that is also shown in FIG. 8. The threaded socket 43 of the plug 39 is screwed into the inner thread 63. The plug 39 is screwed into the receiving opening 62 to such an extent that the stop 44 of the plug 39 rests against one side 64 of the nose 47 and the locking nose 72 is positioned in a locking receptacle 73 of the nose 47.

As shown in FIG. 9, a receiving opening 62 for each antivibration element 30, 31, 32, 33 (FIG. 5) is provided in the shell part 54 of the blower housing 12.

For mounting the antivibration elements 30, 31, 32, 33, the plugs 38 and 39 are first screwed into the coil spring 37. Subsequently, the plugs 39 are screwed into the receiving openings 62 until the end 66 of the coil springs 37 rests against the stop 45 of the plugs 39 and the stop 44 of the plug 39 rests against the shell part 54, respectively. Subsequently, the shell part 50 of the grip housing 13 is arranged such that the antivibration elements 31, 32, and 33 are arranged in the receptacles 34, 35, 36 and are substantially enclosed by the receptacles. Because the counter toothing 60 cooperates with the toothings 41, the antivibration elements 31, 32, 33 are already prefixed. The final fixation by means of the fastening screw 58 can be accomplished also during a later mounting step. In the area of the open side 25 of the end member 24 a counter toothing (not shown) for the plug 38 of the antivibration element 30 is provided.

The configuration of the plug 39 with a threaded socket 43 represents an invention in itself; this configuration can be realized also in the case of antivibration elements that are not arranged in a cup-shaped receptacle. The configuration of the plug enables a simple construction of the component on which the plug is to be secured. Mounting is facilitated because mounting of the antivibration element can be accomplished from one side. In this way, a fast and simple assembly is possible.

The motor unit 2 and the blower unit 3 are arranged on opposed sides of the C-shaped grip unit 4. In this way, a beneficial weight distribution in blower operation of the power tool is achieved. In vacuum operation, the vacuum/blower device 1 is guided by gripping both handles 18, 19 so that the grip unit 4 is approximately horizontal and the motor unit 2 is arranged above the blower unit 3.

It can also be provided that at least one antivibration element is surrounded across a first portion of its longitudinal extension by a receptacle in the first housing part and across a second portion of its longitudinal extension by a receptacle in the second housing part. The antivibration element is advantageously arranged across more than half of its longitudinal extension, in particular about the bigger part of its length, in one or in two receptacles that enclose the antivibration element.

While specific embodiments of the invention have been shown and described in detail to illustrate the inventive principles, it will be understood that the invention may be embodied otherwise without departing from such principles.

What is claimed is:

1. A hand-guided power tool comprising:
a housing comprising a first housing part and a second housing part;
a grip unit having at least one handle for guiding the power tool and comprising the first housing part;
a motor unit arranged in the second housing part and comprising a drive motor;
wherein the grip unit and the motor unit are connected to one another by at least one antivibration element;
wherein the at least one antivibration element has a first end secured to the first housing part and a second end secured to the second housing part;

wherein the first housing part encloses a hollow interior and has at least one receptacle that is cup-shaped and extends from an exterior of the first housing part into the hollow interior, wherein the at least one antivibration element has a longitudinal extension and more than half of the longitudinal extension is surrounded by the at least one receptacle;

wherein the first housing part has two shell parts and the two shell parts abut one another in a separation plane in the area of the at least one antivibration element, wherein the separation plane extends transversely to the longitudinal extension of the at least one antivibration element and wherein the at least one receptacle extends through the separation plane.

2. The power tool according to claim 1, wherein the first end of the at least one antivibration element is secured on a bottom of the at least one receptacle.

3. The power tool according to claim 1, comprising at least three of the at least one antivibration element extending through the separation plane.

4. The power tool according to claim 1, wherein the at least one antivibration element comprises a coil spring.

5. The power tool according to claim 4, wherein the at least one antivibration element comprises a first fastening element arranged at the first end and a second fastening element arranged at the second end, wherein the coil spring is secured with the first and second fastening elements to the first and second housing parts, respectively.

6. The power tool according to claim 5, wherein at least one of the first and second fastening elements is screwed into an end of the coil spring.

7. The power tool according to claim 5, wherein the first fastening element is provided with a device securing a rotational position of the first fastening element relative to the first housing part.

8. The power tool according to claim 7, wherein the first fastening element is arranged in the at least one receptacle in the first housing part.

9. The power tool according to claim 5, wherein the second fastening element has a threaded socket with which the second fastening element is screwed into a receiving opening of the second housing part.

10. The power tool according to claim 9, wherein the second fastening element has a stop delimiting a screwing depth of the second fastening element into the second housing part.

11. The power tool according to claim 1, wherein the power tool is a vacuum/blower device comprising a blower unit.

12. The powertool according to claim 11, wherein the second housing part forms a shell part of a blower housing of the blower unit and a rear wall of a motor housing of the motor unit of the power tool.

13. The power tool according to claim 1, wherein more than 80% of the longitudinal extension of the at least one antivibration element is surrounded by the at least one receptacle.

* * * * *